UNITED STATES PATENT OFFICE.

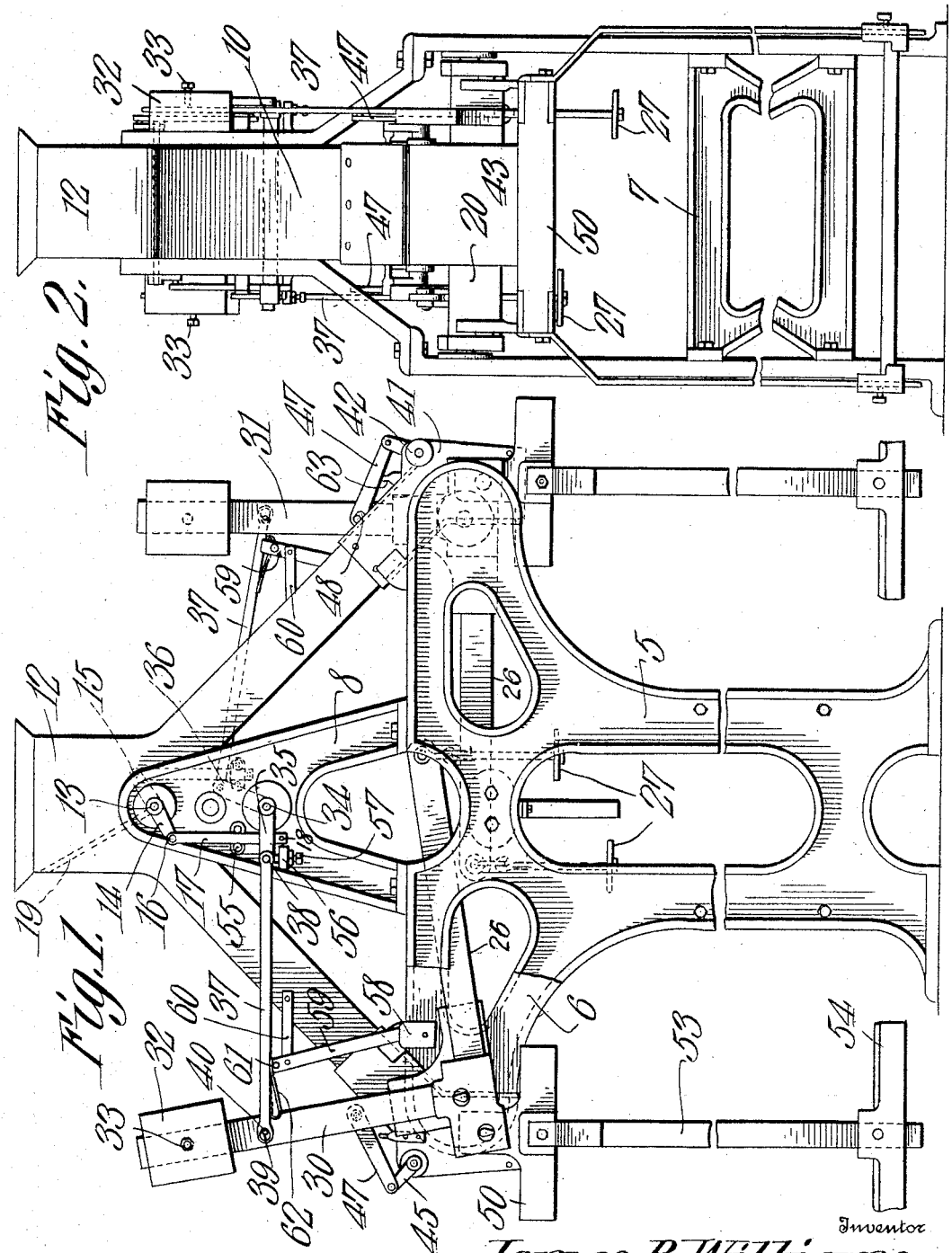

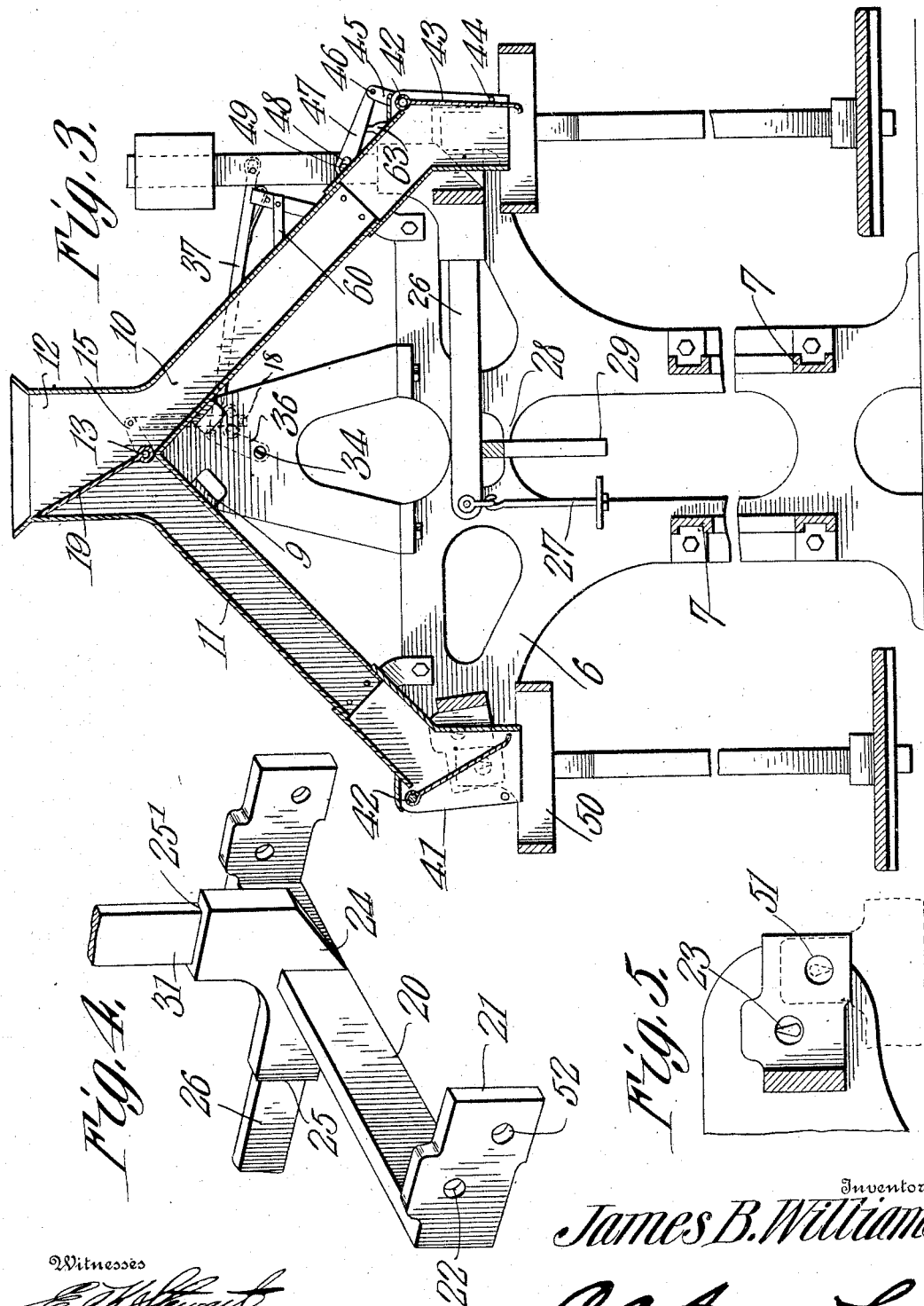

JAMES B. WILLIAMS, OF MINDEN, LOUISIANA.

AUTOMATIC WEIGHING AND BAGGING MACHINE.

946,184. Specification of Letters Patent. Patented Jan. 11, 1910.

Application filed October 19, 1908. Serial No. 458,416.

*To all whom it may concern:*

Be it known that I, JAMES B. WILLIAMS, a citizen of the United States, residing at Minden, in the parish of Webster and State of Louisiana, have invented a new and useful Automatic Weighing and Bagging Machine, of which the following is a specification.

This invention relates to machines for automatically weighing and bagging grain and similar material and has for its object to effect certain improvements in machines of this character whereby the scale beams are nicely balanced and rendered practically frictionless.

A further object of the invention is to provide the scale beams with weighted arms which are operatively connected with the main valve of the discharge chutes whereby the tilting movement of said arms will effect the opening and closing of the main valve.

A further object is to provide an auxiliary valve at the mouth of each discharge chute, said auxiliary valve being operatively connected with and operated by the weighted members of the scale beams.

A further object is to so arrange the connection between the main valve and weighted members of the scale beams that when one of the scale beams is in poise position the opposite beam will be locked against tilting movement.

A still further object is to generally improve this class of machines so as to increase their utility, durability and efficiency.

Further objects and advantages will appear in the following description, it being understood that various changes in form, proportions and minor details of construction may be resorted to within the scope of the appended claims.

In the accompanying drawings forming a part of this specification: Figure 1 is a side elevation of an automatic weighing and bagging machine constructed in accordance with my invention. Fig. 2 is an end elevation of the same. Fig. 3 is a vertical sectional view. Fig. 4 is a perspective view of one of the bail supporting brackets detached. Fig. 5 is a detail side elevation partly in section showing the manner of mounting the bail supporting brackets on the frame of the machine.

Similar numerals of reference indicate corresponding parts in all of the figures of the drawings.

The improved machine forming the subject matter of the present invention includes a supporting frame preferably constructed of forged cast metal and consisting of side members 5 having their upper ends extended laterally at 6 and their intermediate portions spaced apart by a connecting web 7.

Secured to the upper longitudinal edges of the side members 6 are spaced uprights or supports 8 provided with inwardly extending flanges 9 between which are supported a pair of diverging discharge chutes 10 and 11, said chutes leading from a hopper 12 of any approved construction.

Journaled in the walls of the hopper 12 is a rock shaft 13 provided with oppositely disposed crank arms 14 and 15 to each of which is pivotally mounted at 16 a depending rod or hanger 17 terminating in a laterally extending hook 18.

Secured to and movable with the rock shaft 13 is a main valve 19 which serves to control the admission of grain or other material from the hopper 12 into the discharge chutes 10 and 11.

Pivotally mounted for tilting movement between the extensions 6 of the supporting frame are brackets 20 provided with angularly disposed arms 21 having openings 22 formed therein for the reception of suitable knife edges 23 projecting laterally from the inner walls of the extensions 6 and which constitute fulcrums for the brackets 20.

Secured to or formed integral with each bracket 20 is an angularly disposed enlargement 24 having sockets 25 and 25' formed therein and in one of which is seated a longitudinally disposed scale beam 26. The rear end of each scale beam 26 is provided with a pendent weight 27 and is adapted to rest on a stop bar 28 when the scale beam is in poise position. The stop bar 28 extends transversely across the frame of the machine and serves to limit the downward movement of the inner end of the scale beam, there being a bracket or hanger 29 depending from the stop bar 28 for limiting the lateral movement of the pendent weights 27. Seated in the sockets 25' of the bracket enlargements are vertically disposed arms 30 and 31 each having a weight 32 slidably mounted thereon and clamped in adjusted position by a screw or similar fastening device 33.

Journaled in the uprights 8 at a point beneath the rock shaft 13 is a similar rock shaft 34 having its opposite ends provided with terminal crank arms 35 and 36, which latter are preferably of greater length than the crank arms of the rock shaft 13. The crank arms 35 and 36 are operatively connected with the adjacent weighted arms 30 and 31 of the scale beams through the medium of links or rods 37, each having one end thereof pivotally mounted at 38 to the adjacent crank arm and its opposite end formed with an elongated slot 39 adapted to receive a pin 40 carried by the adjacent weighted arm.

The lower ends of the discharge chutes 10 and 11 are provided with housings 41 in the side walls of which are journaled rock shafts 42 each provided with a depending auxiliary valve 43 adapted to close the end of the adjacent chute and thus cut off the column of grain in said chute when the adjacent scale beam is tilted. The auxiliary valves 43 are secured to and movable with the rock shafts 42 so that when the latter are partially rotated the valves will be moved to closed position, said valves being normally supported in open position and prevented from moving outwardly by means of stop pins 44 projecting inwardly from the adjacent walls of the casing 11, as shown.

Secured to the opposite ends of the rock shafts 42 are crank arms 45 to which are pivotally connected at 46 relatively short links 47. The links 47 are formed with slots or openings 48 which receive suitable pins 49 extending inwardly from the adjacent weighted arms of the scale beams. It will thus be seen that when one of the scale beams is tilted by the weight of the grain, the weighted arm of said scale beam will be moved laterally until the pin 40 engages the adjacent wall of the slot 39 and in which event it will exert a longitudinal pull on the link or rod 37 and through the medium of the crank arms 35 and 36 move the weighted arm of the opposite scale beam to vertical position, as will be more fully explained hereinafter.

Depending from the brackets 20 are substantially rectangular bag holders or bails 50, which latter are fulcrumed on the brackets by means of knife edges 51 which engage circular openings or apertures 52 formed in the adjacent arms 21. The brackets 50 are provided with depending bars 53 to the lower ends of which are secured adjustable platforms 54 adapted to receive and support the sacks for containing the grain or other material being weighed.

Attention is here called to the fact that the terminal hooks 18 of the hangers 17 extend in the path of movement of the crank arms 35 and 36 so that when said crank arms are actuated the main valve 19 will be operated to control the flow or passage of grain into the discharge chutes. The hangers 17 are maintained in vertical position by spaced anti-friction rollers 55 thereby to insure positive contact of the hooks 18 with the crank arms. As a means for limiting the downward movement of the crank arms 35 and 36 there are provided suitable brackets 56 which extend laterally from the uprights 8 and are provided with threaded perforations in which are mounted for rotation adjusting screws 57. It will thus be seen that by adjusting the screws 57 the throw of the crank arms 35 and 36 may be controlled at will.

Secured to the upper longitudinal edges of the side members 5 of the frame are sockets 58 in which are secured inclined rods or levers 59 each having its upper end rigidly secured to the adjacent discharge chute by a horizontally disposed bar 60. Extending laterally from the upper end of each inclined lever 59 is a pin 61 which engages a spring 62 carried by and secured to the lower longitudinal edge of the adjacent connecting link 37, as shown. The springs 62 by engagement with the pins 61 serve to sustain the weight of the connecting links 37 when the scale beams are in poise position and thus take the weight of said link off from the pins 40. Suitable supporting brackets 63 are also preferably secured to the casings 41 of the chutes and extended in the path of movement of the links 47 for sustaining the weight of said links when the adjacent scale beams are in poise position.

In operation the grain is fed from a thresher or other source of supply into the hopper 12, and assuming the valve 19 to be in the position shown in Figs. 1 and 2 of the drawing the grain will flow through the chute 10 into the bag or sack until a predetermined quantity has been delivered thereto when the adjacent scale beam 26 will tilt and effect a corresponding movement of the weighted arm 31. When the pin 40 on the arm 31 engages the adjacent wall of the slot 39 said arm will exert a longitudinal pull on the rod 37 and through the medium of the crank arms 35 and 36 move the opposite weighted arm 30 to vertical position and at the same time the crank arm 36 will engage the hook 18 of the adjacent hanger 17 and shift the valve 19 so as to cut off the flow of grain through the chute 10 and direct the same into the chute 11. As the arm 31 moves downwardly the pin 49 will engage the wall of the slot 48 and through the medium of the link 47 tilt the rock shaft 42 so as to effect the closing movement of the adjacent auxiliary valve 43. When the weighted arm 30 of the opposite scale beam is moved to vertical position the link 47 of said beam will actuate the auxiliary valve 43 of the chute 11 so as to permit said valve to drop by gravity to open position and thus allow the grain from the hopper to flow through the chute 11 into the sack on the platform 54.

Attention is here called to the fact that when one of the scale beams is in poise position the link 37 of the opposite scale will be disposed in alinement with the crank arm 35 or in other words on dead center thus locking said scale beam against tilting movement until the mating scale beam is overbalanced. It will also be observed that when either scale beam is overbalanced the movement of the weighted arm of said beam will move the link 37 of the opposite or mating scale beam off dead center so as to permit the same to return to poise position.

From the foregoing description it is thought that the construction and operation of the device will be readily understood by those skilled in the art and further description thereof is deemed unnecessary.

Having thus described the invention what is claimed is:

1. In an automatic weighing and bagging machine a discharge chute, a valve for controlling the passage of material into said chute, a scale beam, and a weighted member carried by the scale beam and operatively connected with the valve for effecting the movement of the latter when the scale beam is tilted.

2. In an automatic weighing and bagging machine a plurality of discharge chutes, a valve for controlling the passage of material into said chutes, scale beams actuated alternately by the weight of the material, and weighted members carried by the scale beams and operatively connected with the valve for effecting the movement of the latter when the scale beams are tilted.

3. In an automatic weighing and bagging machine a plurality of discharge chutes, a valve for controlling the passage of material into said chutes, scale beams actuated alternately by the weight of the material, weighted members carried by the scale beams, crank arms for operating the valve, and links forming a connection between the crank arms and weighted members.

4. In an automatic weighing and bagging machine a plurality of discharge chutes, a valve for controlling the passage of material into said chutes, scale beams actuated alternately by the weight of the material, weighted members carried by the scale beams, crank arms for operating the valve, and links forming a connection between the crank arms and weighted members, one of said scale beams being locked against tilting movement when the other is in poise position.

5. In an automatic weighing and bagging machine, a plurality of discharge chutes, a valve for controlling the passage of material into said chutes, scale beams actuated alternately by the weight of the material, weighted members carried by the scale beams, crank arms secured to the valve, auxiliary crank arms disposed beneath the valve, hangers depending from the crank arms of the valve and provided with terminal hooks extending in the path of movement of the auxiliary crank arms, and links forming a connection between the auxiliary crank arms and weighted members.

6. In an automatic weighing and bagging machine, a plurality of discharge chutes, a main valve for controlling the discharge of material into said chutes, scale beams actuated alternately by the weight of the material, weighted members carried by the scale beams and operatively connected with the main valve for effecting the movement of the latter, auxiliary valves for controlling the discharge of material from said chutes, and connections between the auxiliary valves and weighted members for automatically closing said auxiliary valves.

7. In an automatic weighing and bagging machine, a plurality of discharge chutes, a main valve for controlling the passage of material into said chutes, a shaft disposed beneath the valve and provided with terminal crank arms, scale beams each provided with a weighted arm, pins extending laterally from said arms, and links pivotally connected with the adjacent crank arms and having their opposite ends provided with slots for the reception of the pins on the arms of the scale beams.

8. In an automatic weighing and bagging machine, a plurality of discharge chutes, a main valve for controlling the passage of grain into said chutes, a shaft journaled beneath the valve and provided with terminal crank arms, hangers depending from the main valve and extended into the path of movement of the arms and actuated by the latter for effecting the movement of the valve, scale beams actuated alternately by the weight of the material and each provided with a weighted arm, pins extending laterally from said arms, and links pivotally connected with the crank arms and having their opposite end formed with slots for the reception of the pins.

9. In an automatic weighing and bagging machine, a plurality of discharge chutes, a main valve for controlling the passage of material into said chutes, auxiliary valves for controlling the discharge of material from said chutes, a shaft disposed beneath the main valve and provided with terminal crank arms, hangers depending from the valve and operable by engagement with the crank arms for effecting the movement of the main valve, scale beams operable alternately by the weight of the material and provided with weighted members, links each having a pin and slot connection with the adjacent weighted member and operatively connected with the crank arms, and a connection between the weighted members and the auxiliary valve.

10. In an automatic weighing and bagging machine, a plurality of discharge chutes, a valve for controlling the passage of material into said chutes, a shaft arranged beneath the valve and provided with terminal crank arms, scale beams operable alternately by the weight of the material, weighted members carried by the scale beams, links forming a connection between the crank arms and weighted members, hangers depending from the valve and actuated by the crank arms for effecting the movement of the latter, and means for limiting the movement of the crank arms.

11. In an automatic weighing and bagging machine, a plurality of discharge chutes, a main valve for controlling the passage of material into said chutes, crank arms disposed beneath the main valve, scale beams actuated alternately by the weight of the material, weighted members extended vertically from the scale beams, links connecting the crank arms and weighted members, hangers depending from the valve and actuated by the crank arms for effecting the movement of said valve, supports secured to the chute, and springs carried by the links and bearing against the supports, there being a pin and slot connection between the weighted members and the adjacent end of each link.

12. In an automatic weighing and bagging machine, a plurality of discharge chutes, a main valve for controlling the passage of material into said chutes, crank arms disposed beneath the valve, scale beams actuated alternately by the weight of the material and each provided with a vertically disposed weighted member, links pivotally connected with the crank arms and each having a pin and slot connection with the adjacent weighted member, auxiliary valves for controlling the discharge of material from said chute, crank arms carried by the auxiliary valves, and links pivotally connected with the crank arms of said auxiliary valve and each having a pin and slot connection with the adjacent weighted member.

13. In an automatic weighing and bagging machine, a supporting frame, discharge chutes mounted on the frame, a valve for controlling the passage of material into said chutes, crank arms disposed beneath the valve, brackets mounted on the frame and each provided with a scale beam, an arm extending vertically from the scale beam, a weight adjustable vertically of each arm, links connecting the arms of the scale beams with the crank arms, sack supporting bails depending from the brackets, and hangers carried by the valve and actuated by the crank arms for effecting the movement of the valve.

14. In an automatic weighing and bagging machine, a supporting frame, a plurality of discharge chutes secured to the frame, a main valve for controlling the passage of material into the discharge chutes, auxiliary valves for controlling the discharge of material from said chutes, scale beams fulcrumed on the frame, arms extending vertically from the scale beams, weights slidably mounted on said arms, crank arms disposed beneath the main valve, pins extending laterally from the weighted arms, links each having one end thereof pivotally connected with the adjacent crank arm and its opposite end formed with a slot for the reception of the pin on the adjacent weighted arm, hangers depending from the main valve and extending in the path of movement of the crank arms for effecting the movement of the main valve, links pivotally connected with the auxiliary valves and each having a pin and slot connection with the adjacent weighted arms, means for limiting the downward movement of the scale beams, and means for sustaining the weight of the links when the scale beams are in poise position.

15. In an automatic weighing and bagging machine, a plurality of discharge chutes, a valve for controlling the passage of material into said chutes, scale beams actuated alternately by the weight of the material, arms extending upwardly from the scale beams, and means operatively connected with the arms and valve, respectively, for positively locking one of the scale beams against tilting movement when the other is in poise position.

16. In an automatic weighing and bagging machine, a plurality of discharge chutes, a valve for controlling the passage of material into said chutes, scale beams actuated alternately by the weight of the material, a rock shaft, arms extending upwardly from the scale beams, and means connecting the arms and rock shaft for positively locking one of the scale beams against tilting movement when the other is in poise position.

17. In an automatic weighing and bagging machine, a plurality of discharge chutes, a valve for controlling the passage of material into said chutes, scale beams actuated alternately by the weight of the material, a rock shaft provided with terminal crank arms, weighted arms extending upwardly from the scale beams, and links forming a pivotal connection between the weighted arms and arms of the rock shaft for positively locking one of the scale beams against tilting movement when the other is in poise position.

18. In an automatic weighing and bagging machine, a plurality of discharge chutes, a valve for controlling the passage of material into said chutes, scale beams actuated alternately by the weight of the material, arms extending upwardly from the scale beams, a rock shaft provided with terminal crank arms, links forming a pivotal connection between the weighted arms and arms of the rock shaft for positively locking one of the scale beams against tilting movement when the other is in poise position, the pivot points of the links being alternately disposed in alinement with the axis of the rock shaft for effecting the locking operation.

19. In an automatic weighing and bagging machine, a supporting frame, a plurality of discharge chutes mounted on the frame, a valve for controlling the passage of material into said chutes, scale beams actuated alternately by the weight of the material, weighted arms extending upwardly from the scale beams, a rock shaft journaled in the frame and provided with terminal crank arms, and links forming a pivotal connection between the weighted arms and crank arms of the rock shaft for positively locking one of the scale beams against tilting movement when the other is in poise position, the pivot points of the links being disposed alternately in horizontal alinement with the axis of the rock shaft for effecting the locking operation.

20. In an automatic weighing and bagging machine, a supporting frame, a plurality of discharge chutes mounted on the frame, a main valve for controlling the passage of material into said chutes, auxiliary valves for controlling the discharge of material from the chutes, scale beams fulcrumed on the frame and actuated alternately by the weight of the material, weighted arms extending vertically from the scale beams, a rock shaft journaled in the supporting frame beneath the main valve and provided with terminal crank arms, hangers depending from the main valve and disposed in the path of movement of said crank arms, links forming a pivotal connection between the weighted arms and crank arms for positively locking one of the scale beams against tilting movement when the other is in poise position, and a connection between each auxiliary valve and the adjacent weighted arm for operating said auxiliary valve to cut off the discharge of material from the adjacent chute when the arm is tilted.

In testimony that I claim the foregoing as my own, I have hereto affixed my signature in the presence of two witnesses.

JAS. B. WILLIAMS.

Witnesses:
 E. CLEMENT,
 M. RATHBUN.